United States Patent

[11] 3,565,108

| [72] | Inventor | Charles E. Johnson<br>Ann Arbor, Mich. |
|---|---|---|
| [21] | Appl. No. | 827,506 |
| [22] | Filed | May 26, 1969 |
| [45] | Patented | Feb. 23, 1971 |
| [73] | Assignee | Double A Products Co.<br>Manchester, Mich.<br>a corporation of Michigan<br>Continuation-in-part of application Ser. No. 664,756, Aug. 31, 1967, now abandoned. |

[54] FLUID VALVE
19 Claims, 5 Drawing Figs.

[52] U.S. Cl. ................................................. 137/529,
137/530, 137/539.5, 137/543.17
[51] Int. Cl. ............................................... F16k 15/04
[50] Field of Search ............................................ 267/161,
162; 137/529, 530, 539, 539.5, 540, 543.17, 524

[56] References Cited
UNITED STATES PATENTS

| 1,343,735 | 6/1920 | MacBryde | 137/530X |
| 2,070,659 | 2/1937 | Higham | 137/529 |
| 2,162,719 | 6/1939 | Hay | 267/162 |
| 2,322,139 | 6/1943 | Kaelin | 137/539.5X |
| 2,632,621 | 3/1953 | Gamble | 267/162X |
| 3,302,662 | 2/1967 | Webb | 267/161X |

FOREIGN PATENTS

| 588,004 | 5/1947 | Great Britain | 137/540 |

Primary Examiner—Robert G. Nilson
Attorney—Harness, Dickey & Pierce

ABSTRACT: A relief valve having conical springs providing bias for urging a valve element against a valve seat.

INVENTOR.
Charles E. Johnson

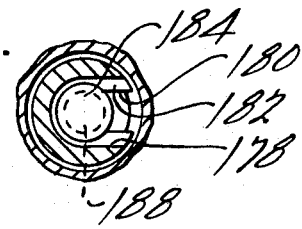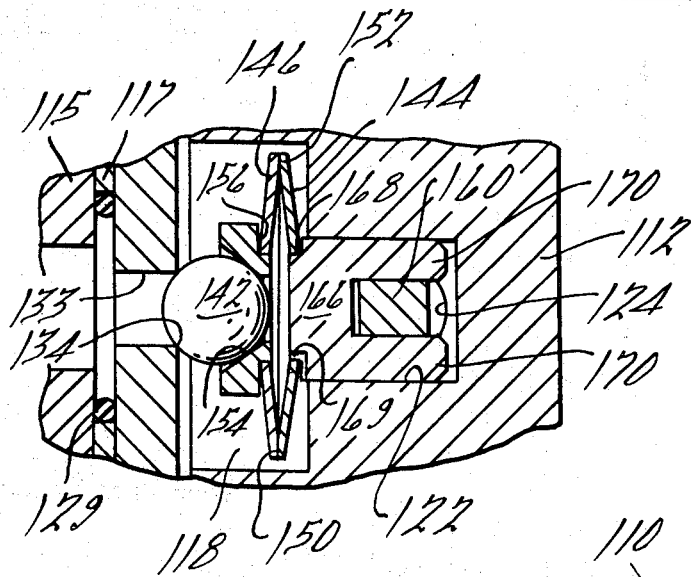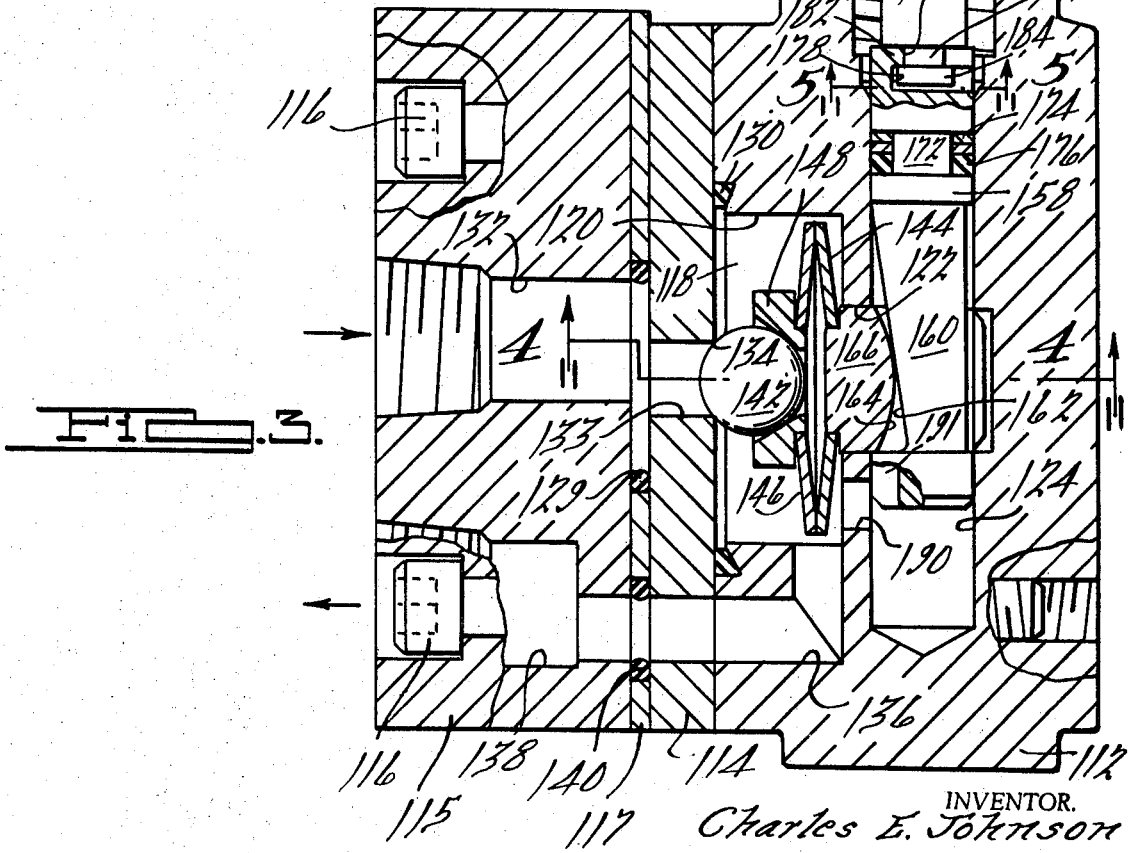

FLUID VALVE

CROSS REFERENCE TO RELATED APPLICATION

This application is a continuation-in-part of my copending application, Ser. No. 664,756, filed Aug. 31, 1967 now abandoned entitled Fluid Valve.

BACKGROUND OF THE INVENTION

The relief valve of the present invention is an improvement over conventional conical and ball-type relief valves. In such conventional relief valves fluid flow is controlled by a conically or spherically-shafted valve member which is urged into engagement with a valve seat by means of a coil spring, one end of which engages the valve member and the other end of which is affixed to the valve housing, or to an adjustable element if the valve is adjustable. Since it is undesirable to in any way restrain axial movement of such valve springs (i.e. movement along the longitudinal axis of the spring), clearance is usually provided between the spring and the valve housing to at least eliminate frictional restraints. However, coil springs are notoriously unstable in a transverse direction and consequently are unable to counteract the known tendency of such valve elements to move in a transverse direction or cock when lifted off the valve seat under the influence of fluid under pressure. Furthermore this undesirable tendency can actually be amplified by such springs because it is extremely difficult to grind the ends of a coil spring to form truly parallel end surfaces and the existence of an oblique end surface on such a spring will cause it to actually exert a positive force in a transverse direction.

This offcenter or cocking movement will result in pressure differentials across the valve member which will in turn cause chatter and excessive wear particularly in the case of valves having conical valve elements. The problem of chatter can be partially solved by guiding the valve member, and in some relief valves such guiding is provided; however, valves having such guiding means suffer the disadvantage that the guide means induces a substantial amount of friction which restrains free axial movement of the spring and valve member, resulting in inconsistent and erratic valve operation. Furthermore, they substantially increase the cost of the valve because of the close tolerance required.

It is therefore an object of the present invention to provide a relatively simple and inexpensive relief valve which overcomes the aforementioned disadvantages of prior art relief valves.

It is another object of the present invention to provide a relief valve in which substantially frictionless guide means is provided for achieving consistent and accurate valve operation.

Another object of this invention resides in the provision of a relief valve which has a larger flow capacity for a given physical size than many conventional relief valves.

A further object of this invention concerns the provision of a relief valve incorporating spring means which is substantially less subject to cocking or transverse movement than conventional coil springs and which does not introduce undesirable frictional restraints.

Another object resides in the provision of such a relief valve wherein the precompression of the spring means may be varied to an extremely accurate degree.

Other objects, features, and advantages of the present invention will become apparent from the subsequent description and the appended claims, taken in conjunction with the accompanying drawings.

BRIEF DESCRIPTION OF THE DRAWINGS

FIG. 3 is a longitudinal sectional view of a second embodiment of the relief valve of the present invention;

FIG. 4 is a transverse sectional view taken generally along the line 4—4 in FIG. 3; and FIG. 5 is a transverse sectional view taken generally along line 5—5 in FIG. 3.

DESCRIPTION OF THE PREFERRED EMBODIMENTS

Figure 1:
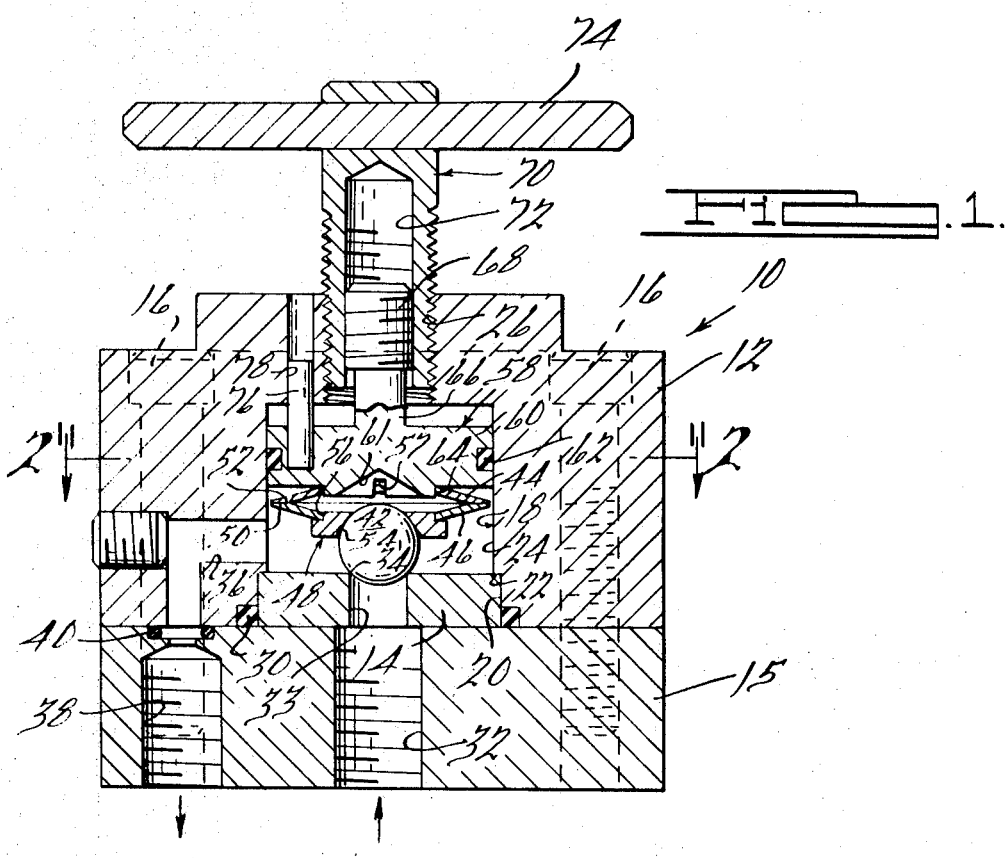
FIG. 1 is a longitudinal sectional view of one embodiment of the relief valve of the present invention.
Figure 2:
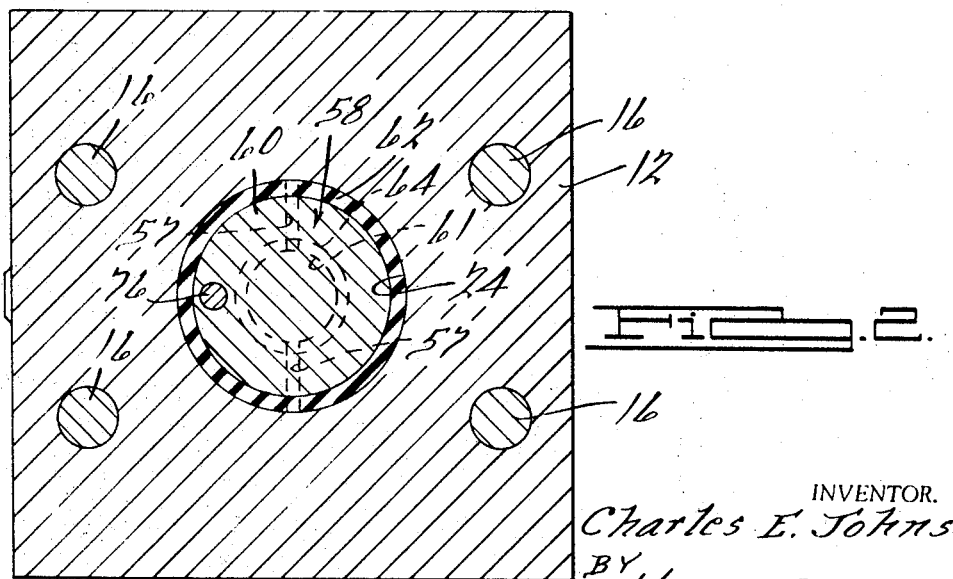
FIG. 2 is a transverse sectional view of the relief valve of FIG. 1 taken generally along line 2—2.

The first embodiment of the relief valve of the present invention, FIGS. 1 and 2, is generally indicated by the numeral 10 and includes a control head member 12, a valve seat member 14 and an end plate 15, all of which are held together by a plurality of bolts 16 connecting member 12 and plate 15 together.

The control head 12 has a through bore 18 which is of a stepped construction having an enlarged bore portion 20 at its lower end which defines a shoulder 22 with an intermediate diameter bore portion 24. The bore 18 terminates in a threaded, reduced bore portion 26 at the upper end of the control head 12. The valve seat member 14 is located in the enlarged bore portion 20 against the shoulder 22 and has a through opening 33 which terminates in a circular valve seat 34. A bore 32, in line with the opening 33, extends axially through the end plate 15 and with opening 33 defines an inlet path which communicates with the intermediate bore 24. An annular seal 30 seals between the seat member 14, the control head 12 and the end plate 15. An outlet from bore portion 24 is defined by a passageway 36 which communicates with a generally axially extending bore 38 through the end plate 15. A seal 40 is located between the juncture of the passageway 36 and the bore 38.

In the present valve the valve element is preferably a ball or spherical member, indicated at 42. Ball member 42 is engageable with the valve seat 34 and is held in engagement therewith by a pair of annular, conical spring members 44 and 46 (Belleville washers) which act on the ball member 42 through a guide member or ball follower 48. The spring members 44 and 46, in contrast to a coil spring, are of a generally flat washer shape and are located in a face-to-face concave-to-concave relation, being in engagement with each other along their outer peripheries which are flattened as at 50 and 52, respectively, to provide a large enough area of contact to prevent high stress points and provide sufficient friction to prevent relative sliding. The conical spring members 44 and 46 are of a size to fit within the intermediate bore portion 24, with a sufficient clearance around their peripheries so that when they are compressed against one another they will not engage the sides of bore portion 24. The guide member 48 has a conical aperture or recess 54 which receives the ball member 42, the conical surface 54 generally overlying a substantial portion of the ball 42 and presenting a substantial area of contact for the ball. The ball follower or guide 48 is provided with a reduced diameter shoulder 56 defining a projection which is located snugly within the opening through the lower conical spring 46. Thus the bias of the springs 44 and 46 is applied to the ball member 42 solely through the guide member 48.

The bias or precompression of the springs 44 and 46 applied to the ball member 42 is set by an adjustable plunger 58. The plunger 58 has an enlarged head portion 60 which is slidably located within the bore portion 24, the head portion 60 having a conical cavity 61 axially in line with and providing additional clearance for the ball 42. An annular seal 62 is located about the periphery of the head portion 60 to provide a seal between the plunger 58 and the intermediate bore portion 24. The head portion 60 is provided at its innermost end with a reduced diameter shoulder 64 defining a projection of a size to snugly fit within the opening through the upper conical spring member 44. A stem 66 extends axially from the head portion 60 into the threaded bore 26 in clearance relation therewith and terminates in a threaded portion 68.

An adjustment screw member 70 has a threaded bore 72 which threadably receives the threaded portion 68 of the stem portion 66. The adjustment screw member 70 is also threaded on its outer surface for threaded engagement within the bore 26. A handle 74 is secured to the adjustment screw 70 to facilitate turning. The external thread on the adjustment screw 70 and the bore 26 and the internal thread on the adjustment screw 70 and the threaded portion 68 of the stem portion 66 are provided with slightly different pitches of the same hand in order to permit a fine (differential pitch) adjustment of the axial position of the adjustable plunger 58, and hence the precompression of the springs 44 and 46, which in turn determines the pressure at which the valve will open. A pin 76 secured to the head portion 60 of the plunger 58 slidably extends through a bore 78 in the upper end of the control head 12 to prevent rotation of the plunger 58 as the screw member 70 is rotated.

The head portion 60 of plunger 58 has a diametrically extending groove 57 which extends from its periphery to cavity 61 to provide a fluid path for placing the space between the spring members 44 and 46 in communication with the rest of the bore portion 24. This insures equal pressures on both sides of both springs 44 and 46.

In operation, when inlet fluid in bores 32 and 33 is of sufficient pressure to overcome the bias of the springs 44 and 46, as established by the position of plunger 58, the ball member 42 will be moved from the valve seat 34, permitting the fluid to flow to outlet passageways 36 and 38. Ball member 42 will be maintained in axial alignment with seat 34 by means of the ball follower 48, and its movement maintained along the axis of the valve seat 34 by the springs 44 and 46.

The second embodiment of the relief valve of the present invention, FIGS. 3 and 4, is generally indicated by the numeral 110 and includes a body 112, a valve seat member 114, and plates 115 and 117, all of which are held together by a plurality of bolts 116 connecting body 112 and plate 115 together.

Body 112 has a first bore 118 having a first bore portion 120 at one end and a second bore portion 122 concentric therewith at the other end, the latter communicating with a second bore 124 disposed in the body at substantially right angles to bore 118 and having a threaded portion 126 at the end thereof. Valve seat member 114 is located across of end of bore portion 120 and has a through opening 133 which terminates in a circular valve seat 134. A bore 132, communicating with opening 133, extends through plates 115 and 117, and with opening 133 defines an inlet path communicating with bore 118. An annular seal 130 provides a seal between the seat member 114, and body 112, and an annular seal 129 between plates 115 and 117 and seat member 114. An outlet from bore 118 is defined by a passageway 136 which communicates with a bore 138 extending through plates 115 and 117. An annular seal 140 provides a seal between the juncture of the passageway 136 and bore 138.

As in the first embodiment, the valve element is preferably a ball or spherical member, indicated at 142. Ball member 142 is engageable with valve seat 134 and is held in engagement therewith by a pair of annular, conical spring members 144 and 146 (Belleville washers) which act on ball member 142 through a guide member or ball follower 148. Spring members 144 and 146, are, as before, in engagement with each other along their outer peripheries, which are flattened as at 150 and 152, respectively, to provide a large enough area of contact to prevent high stress points and to provide sufficient friction to prevent relative sliding. Conical spring members 144 and 146 are of a size to fit within bore portion 120 with a sufficient clearance around their peripheries that when they are compressed against one another they will not engage the sides of bore portion 120. Guide member 148 has a conical aperture or recess 154 which receives ball member 142, conical surface 154 generally overlying a substantial portion of ball 142 and presenting a substantial area of contact for the ball. Ball follower or guide 148 is provided with a reduced diameter shoulder 156 defining a projection which is located snugly within the opening in conical spring 146. Thus, as before, the bias of the springs 144 and 146 is applied to ball member 142 solely through the guide member 148.

The bias or precompression of springs 144 and 146 applied to ball member 142 is established by the position of the adjustable plunger 158 within bore 124. Plunger 158 has a reduced-width portion 160 having thereon an inclined cam surface 162 facing and adapted to engage an arcuate cam surface 164 on a follower member 166 slidably disposed within bore 122 and having a reduced diameter shoulder 168 defining a projection positioned within the center opening in conical spring 144. Shoulders 156 and 168 are concentric and parallel to one another so that longitudinal movement of plunger 158 in bore 124 will cause follower 166 to move along the axis of movement of the conical springs, guide member and ball to thereby vary the precompression force exerted by the springs on the ball, and hence the pressure setting of the valve. To insure that the springs are pressure balanced, bore 118 is placed in fluid communication with the space between the springs by a plurality of L-shaped notches in follower 166, such as shown at 169 in FIG. 4. As can be best seen in FIG. 4, follower 166 is provided with a pair of spaced projections 170 which define therebetween a slot for receiving reduced-width portion 160 of the plunger. This construction operates to prevent rotation of both follower 166 and plunger 158, thereby improving the accuracy of the valve setting without requiring perfectly shaped and aligned surfaces 162 and 164.

Plunger 158 is provided with a reduced-diameter section 172. Surrounding it is a backup ring 174 and an annular seal 176. As best seen in FIG. 5, adjacent one end of plunger 158 is provided a transverse slot 178 having a cylindrical end portion, and at the end a similarly shaped opening 180, whereby there is defined an inwardly opening flange 182 at the end of the plunger. Disposed within slot 178 is a circular boss 184 located at the end of a threaded adjusting screw 186. Boss 184 is connected to adjusting screw 186 by a reduced-diameter cylindrical portion 188 which is of a length substantially equal to the width of flange 182. Thus the shoulder between portion 188 and screw 186 engages the end face of flange 182 and the shoulder between boss 184 and portion 188 engages the inside face of flange 182, whereby axial movement of screw 186 will cause a corresponding movement of plunger 158. Sufficient minimum clearance is provided between the parts that the adjusting screw may be rotated relative to plunger 158, rotation of the latter with respect to body 112 being prevented by projections 170. A lock nut 192 is provided to lock adjusting screw 186 at the desired setting. To further insure that the springs are pressure balanced there is provided a port 190 in the housing and a slot 191 in the end of the plunger so that fluid in bore 118 will be in communication with the backside of follower 166 (i.e., surface 164).

In operation, when inlet fluid in bores 132 and 133 is of sufficient pressure to overcome the bias of the springs 144 and 146, as established by the position of plunger 158, ball member 142 will be moved from the valve seat 134, permitting the fluid to flow to outlet passageways 136 and 138. Ball member 142 will be maintained in axial alignment with seat 134 by means of ball follower 148, and its movement maintained along the axis of the valve seat 134 by springs 144 and 146 in the same manner as in the previous embodiment.

In both embodiments, the ball member does not frictionally engage any member other than the guide member (48 or 148), the latter engages nothing else but the springs, and they engage nothing but the plunger or follower (58 or 166). Hence axial movement of the ball member is substantially frictionless and thus accurate and consistent in operation. The total result of the spring construction, guide and ball arrangement is spring biased axially guided movement of the ball member with substantially no friction between any of the moving parts and any fixed portion of the valve, nor any chance for such friction.

In the two disclosed forms of the invention, only two conical springs are shown, the use of two springs permitting flexibility in design since any combination of spring rates for one or both of the two spring members may be chosen, depending on the flow versus pressure characteristics desired. However, it is to be understood that the present invention is not limited to a construction utilizing only two spring members.

I claim:

1. A valve comprising: a housing having a chamber; inlet and outlet passage means communicating with said chamber; valve means including a valve seat and a valve member movable along an axis toward and away from said valve seat for controlling the flow of inlet fluid through said inlet passage means into said chamber; adjustable support means having a planar support surface in said chamber; a first slightly conical annular spring disposed in said chamber with the inner periphery thereof engaging said support surface; a second slightly conical annular spring disposed in said chamber with the outer periphery thereof engaging the outer periphery of said first spring and the inner periphery thereof connected to said valve member, said valve member including a valve element engageable with said valve seat and guide means disposed between said valve element and said second spring, said guide means having thereon a planar surface engaging the inner periphery of said second spring and a projection extending through the opening in said second spring, said support means having a projection extending through the opening in said first spring, each of said planar surfaces being disposed parallel to one another and perpendicular to said axis; and adjusting means for moving said support means with respect to said valve seat to vary the precompression of said first and second springs.

2. A valve as claimed in claim 1, wherein said adjusting means includes cam means engaging said support means, and means for moving said cam means to thereby move said support means and adjust the precompression of said springs.

3. A valve as claimed in claim 1, wherein said adjusting means includes a first element threadably connected to said housing by threads of a first pitch, and a second element connected to said support member and threadably connected to said first element by threads of a different pitch, whereby very fine differential pitch adjustments may be made to the precompression of said springs.

4. A valve comprising: a housing having a chamber; inlet and outlet passage means communicating with said chamber; valve means including a valve seat and a valve member movable along an axis toward and away from said valve seat for controlling the flow of inlet fluid through said inlet passage means into said chamber; adjustable support means having a supporting surface in said chamber; a first slightly conical annular spring disposed in said chamber with the inner periphery thereof engaging said supporting surface; a second slightly conical annular spring disposed in said chamber with the outer periphery thereof engaging the outer periphery of said first spring and the inner periphery thereof connected to said valve member; and adjusting means for moving said support means with respect to said valve seat to vary the precompression of said first and second springs, said adjusting means including cam means engaging said support means, said cam means including an oblique cam surface mounted in said body for movement along a line disposed substantially transverse to said axis, and means threadably connected to said housing and connected to said cam means to move the latter along said line.

5. A valve as claimed in claim 4, wherein means are provided for preventing rotation of said support means with respect to said cam means and for preventing rotation of said cam means with respect to said housing.

6. A valve comprising: a housing having a chamber; passage means defining a fluid path communicating with said chamber; means defining a valve seat between said passage means and said chamber; support means in said chamber; a valve member in said chamber movable along an axis toward and away from said valve seat, said valve member being at all times spaced from the walls of said chamber except for engagement with said valve seat when the valve is closed; guide means in said chamber engaging said valve member, said guide means being at all times spaced from the walls of said chamber; spring means disposed in said chamber between said support means and said guide means for biasing said valve member toward said valve seat, said spring means including a slightly conical annular spring member centered about said axis, the outer peripheral edge thereof being at all times spaced from the walls of said chamber; and means on said support means for preventing movement of said spring means relative to said support means in a direction transverse to said axis.

7. A valve as claimed in claim 6, further comprising adjusting means for moving said support means with respect to said valve seat to vary the precompression of said spring means.

8. A valve as claimed in claim 7, wherein said adjusting means includes cam means operable on said support means, and means for moving said cam means to thereby move said support means and adjust the precompression of said spring means.

9. A valve as claimed in claim 7, wherein said adjusting means includes cam means having an oblique cam surface mounted in said housing for movement along a line disposed substantially transverse to said axis, said cam surface operable on said support means, and means threadably connected to said housing and connected to said cam means to move the latter along said line.

10. A valve as claimed in claim 7, wherein said adjusting means includes a first element threadably connected to said housing by threads of a first pitch, and a second element connected to said support member and threadably connected to said first element by threads of a different pitch, whereby very fine differential pitch adjustments may be made to the precompression of said spring means.

11. a valve comprising: a housing having a chamber; passage means defining a fluid path communicating with said chamber; means defining a valve seat between said passage means and said chamber; support means in said chamber; a valve member in said chamber movable along an axis toward and away from said valve seat, said valve member being at all times spaced from the walls of said chamber except for engagement with said valve seat when the valve is closed; guide means in said chamber engaging said valve member and including means for preventing movement of said valve member relative to said guide means in a direction transverse to said axis, said guide means being at all times spaced from the walls of said chamber; spring means disposed in said chamber between said support means and said guide means for biasing said valve member toward said valve seat, said spring means including at least two slightly conical annular spring members centered about said axis and engaging one another adjacent their outer peripheral edges with their concave faces facing one another, said outer peripheral edges being at all times spaced from the walls of said chamber; means on said support means engaging the one of said inner peripheral edges most adjacent thereto for preventing movement thereof relative to said support means in a direction transverse to said axis; and means on said guide means engaging the one of said inner peripheral edges most adjacent thereto for preventing movement thereof relative to said guide means in a direction transverse to said axis.

12. A valve as claimed in claim 11, further comprising adjusting means for moving said support means with respect to said valve seat to vary the precompression of said spring means.

13. A valve as claimed in claim 12, wherein said adjusting means includes cam means operable on said support means, and means for moving said cam means to thereby move said support means and adjust the precompression of said spring means.

14. A valve as claimed in claim 12, wherein said adjusting means includes cam means having an oblique cam surface mounted in said housing for movement along a line disposed substantially transverse to said axis, said cam surface operable on said support means, and means threadably connected to said housing and connected to said cam means to move the latter along said line.

15. A valve as claimed in claim 12, wherein said adjusting means includes a first element threadably connected to said housing by threads of a first pitch, and a second element connected to said support member and threadably connected to said first element by threads of a different pitch, whereby very fine differential pitch adjustments may be made to the precompression of said spring means.

16. A valve as claimed in claim 11, wherein said first and second spring members are provided adjacent their outer peripheral edges with annular planar surfaces frictionally engaging one another to maintain said spring members in alignment.

17. A valve as claimed in claim 11, wherein the spring characteristics of said first spring member differ from the spring characteristics of said second spring member.

18. A valve as claimed in claim 11, wherein said spring members are circular and have substantially the same inner and outer diameters, respectively.

19. A valve as claimed in claim 11, wherein said valve member engages said valve seat in a self-centering relationship.